US007590813B1

(12) United States Patent
Szor

(10) Patent No.: US 7,590,813 B1
(45) Date of Patent: Sep. 15, 2009

(54) CACHE SCANNING SYSTEM AND METHOD

(75) Inventor: Peter Szor, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 529 days.

(21) Appl. No.: 10/914,962

(22) Filed: Aug. 9, 2004

(51) Int. Cl.
G06F 12/00 (2006.01)
G06F 13/00 (2006.01)
G06F 13/28 (2006.01)

(52) U.S. Cl. .................... 711/163; 726/22; 726/23; 726/24

(58) Field of Classification Search .......... 711/135, 711/163; 726/22, 23, 24; 713/188; 714/38, 714/36
See application file for complete search history.

(56) References Cited

U.S. PATENT DOCUMENTS

| 5,649,095 A * | 7/1997 | Cozza ................ 714/39 |
| 5,956,481 A * | 9/1999 | Walsh et al. ........... 726/23 |
| 6,088,803 A * | 7/2000 | Tso et al. ............. 726/22 |
| 6,401,210 B1 * | 6/2002 | Templeton ............ 726/24 |
| 6,728,964 B1 * | 4/2004 | Butt ................... 719/313 |
| 2003/0101381 A1 * | 5/2003 | Mateev et al. .......... 714/38 |
| 2004/0010732 A1 * | 1/2004 | Oka .................... 714/13 |
| 2005/0005153 A1 * | 1/2005 | Das et al. ............. 713/200 |
| 2005/0120238 A1 * | 6/2005 | Choi ................... 713/200 |
| 2005/0216759 A1 * | 9/2005 | Rothman et al. ....... 713/200 |
| 2006/0101514 A1 * | 5/2006 | Milener et al. ......... 726/22 |

OTHER PUBLICATIONS

"Microsoft Computer Dictionary", 5th edition, p. 555, defintion of "virus".*

* cited by examiner

Primary Examiner—Kevin L Ellis
Assistant Examiner—Prasith Thammavong
(74) Attorney, Agent, or Firm—Gunnison, McKay & Hodgson, L.L.P.; Serge J. Hodgson

(57) ABSTRACT

A method includes stalling a cache flush instruction to flush a cache; determining that the cache comprises a file that has been infected with malicious code, and terminating the cache flush instruction to prevent the cache from being flushed to disk. By preventing copying of the infected file from the cache to disk, the malicious code is prevented from being propagated to disk. Accordingly, the malicious code is detected and defeated without having the malicious code be present on disk. Thus, detection of an infected file on disk and the repair of the infected file on disk are unnecessary and obviated.

23 Claims, 3 Drawing Sheets

CACHE SCANNING SYSTEM AND METHOD

BACKGROUND OF THE INVENTION

1. Field of the Invention

The present invention relates to the protection of computer systems. More particularly, the present invention relates to a malicious code detection and blocking system and method.

2. Description of Related Art

Often, an anti-virus product gets invoked as an executable file is opened for write and blocks the event if malicious code is detected. This technique assumes that malicious code infects files on hard disk in order to replicate to them. However, such a technique is ineffective against malicious code that infects a file when the file is not on hard disk.

SUMMARY OF THE INVENTION

In accordance with one embodiment, a method includes stalling a cache flush instruction to flush a cache; determining that the cache includes a file that has been infected with malicious code, and terminating the cache flush instruction to prevent the cache from being flushed to disk.

By preventing copying of the infected file from the cache to disk, the malicious code is prevented from being propagated to disk. Accordingly, the malicious code is detected and defeated without having the malicious code copied to disk, e.g., without having the malicious code be present on hard disk. Thus, detection of an infected file on disk and the repair of the infected file on disk are unnecessary and obviated.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
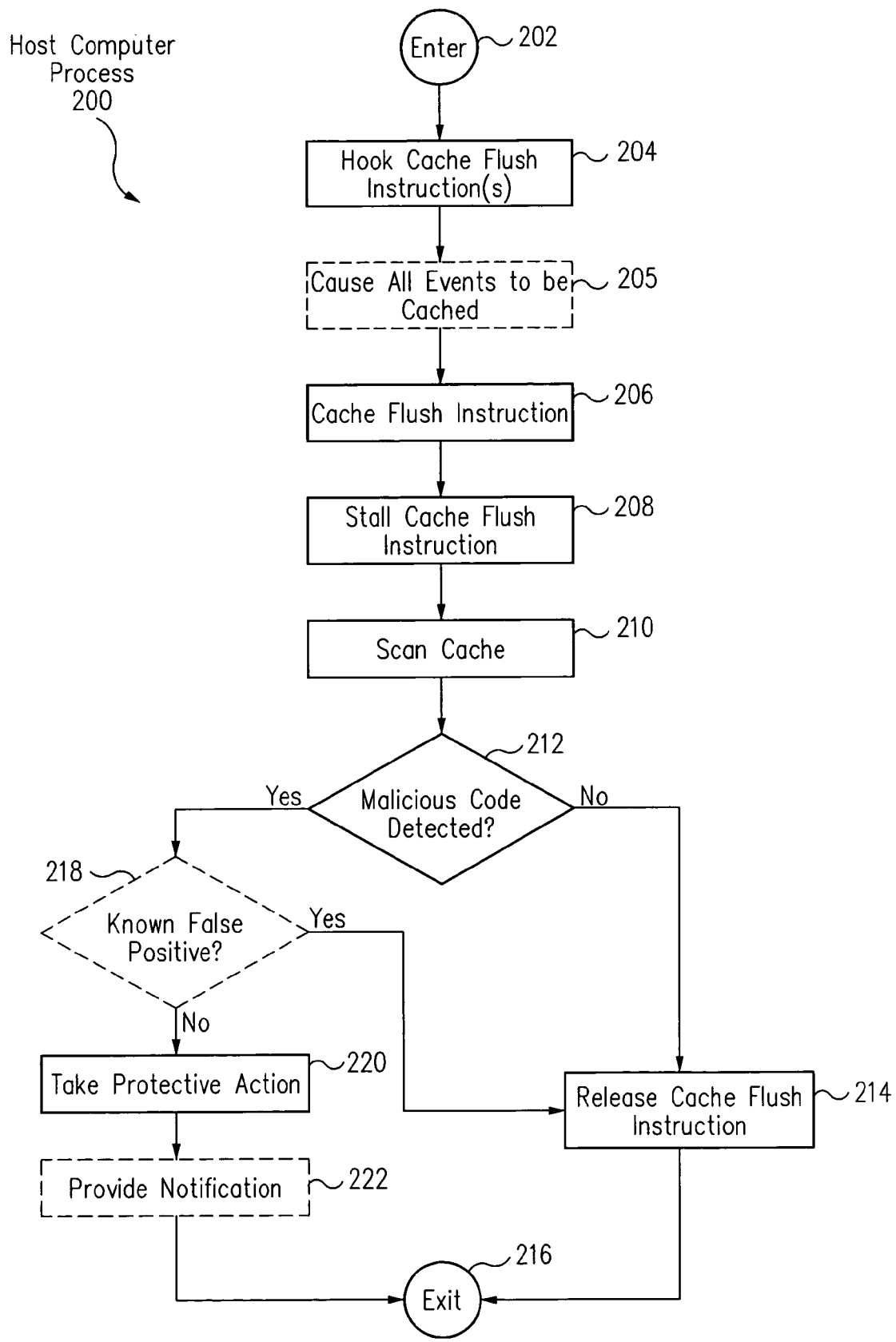
FIG. 2 is a flow diagram of a host computer process in accordance with one embodiment of the present invention.
Figure 3:
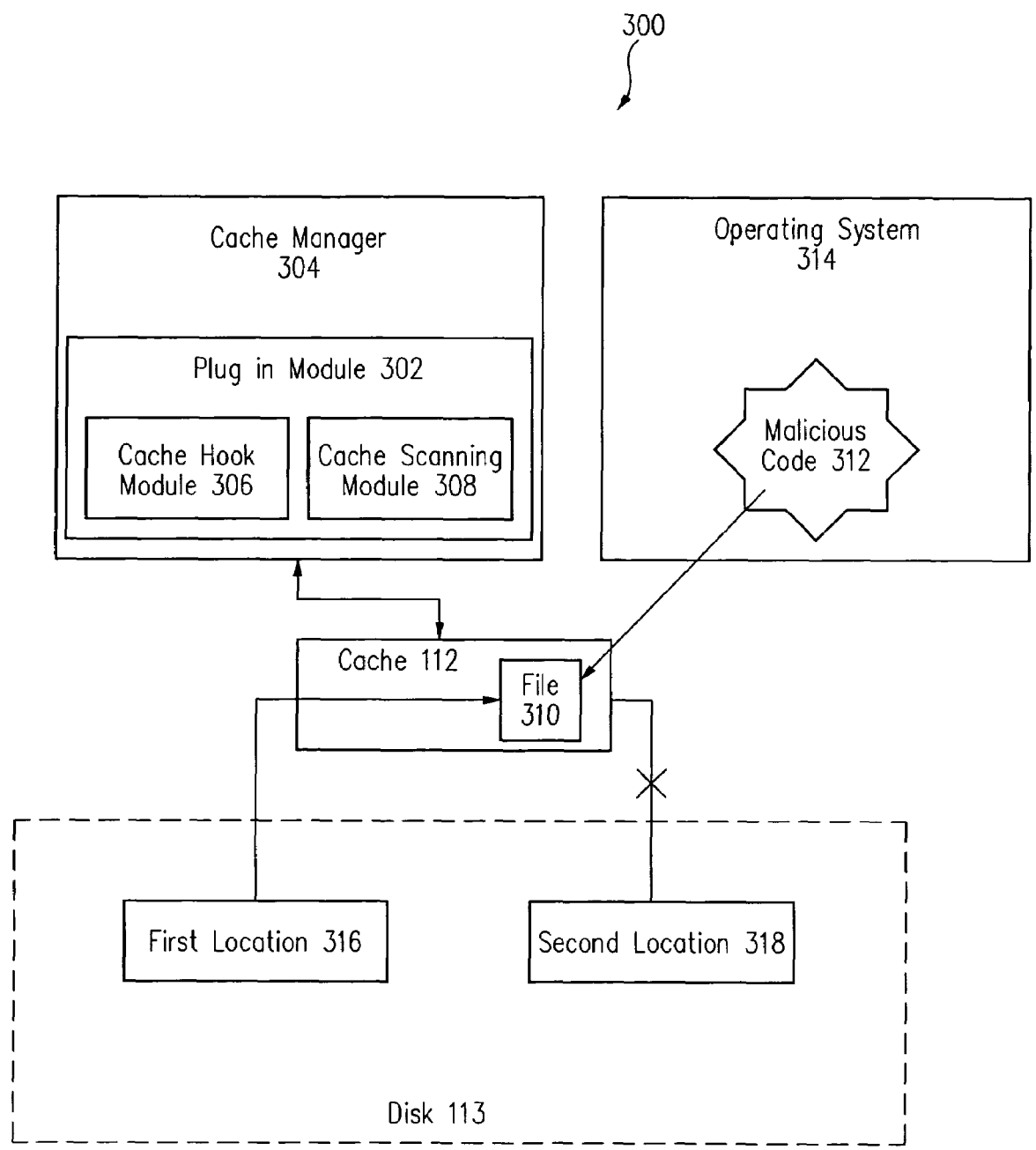
FIG. 3 is a block diagram of a hooked cache in accordance with one embodiment of the present invention.

In accordance with one embodiment, referring to FIGS. 2 and 3 together, a method includes stalling a cache flush instruction to flush a cache 112 in a STALL CACHE FLUSH INSTRUCTION OPERATION 208; determining that cache 112 comprises a file 310 that has been infected with malicious code 312 in a MALICIOUS CODE DETECTED CHECK OPERATION 212, and terminating the cache flush instruction to prevent cache 112 from being flushed to a second location 318, e.g., on a disk 113, in a TAKE PROTECTIVE ACTION OPERATION 220.

By preventing copying of infected file 310 from cache 112 to disk 113, malicious code 312 is prevented from being copied to disk 113. Accordingly, malicious code 312 is detected and defeated without having malicious code 312 copied to disk 113, e.g., without having the malicious code be present on hard disk. Thus, detection of an infected file on hard disk and the repair of the infected file on hard disk are unnecessary and obviated.

Figure 1:
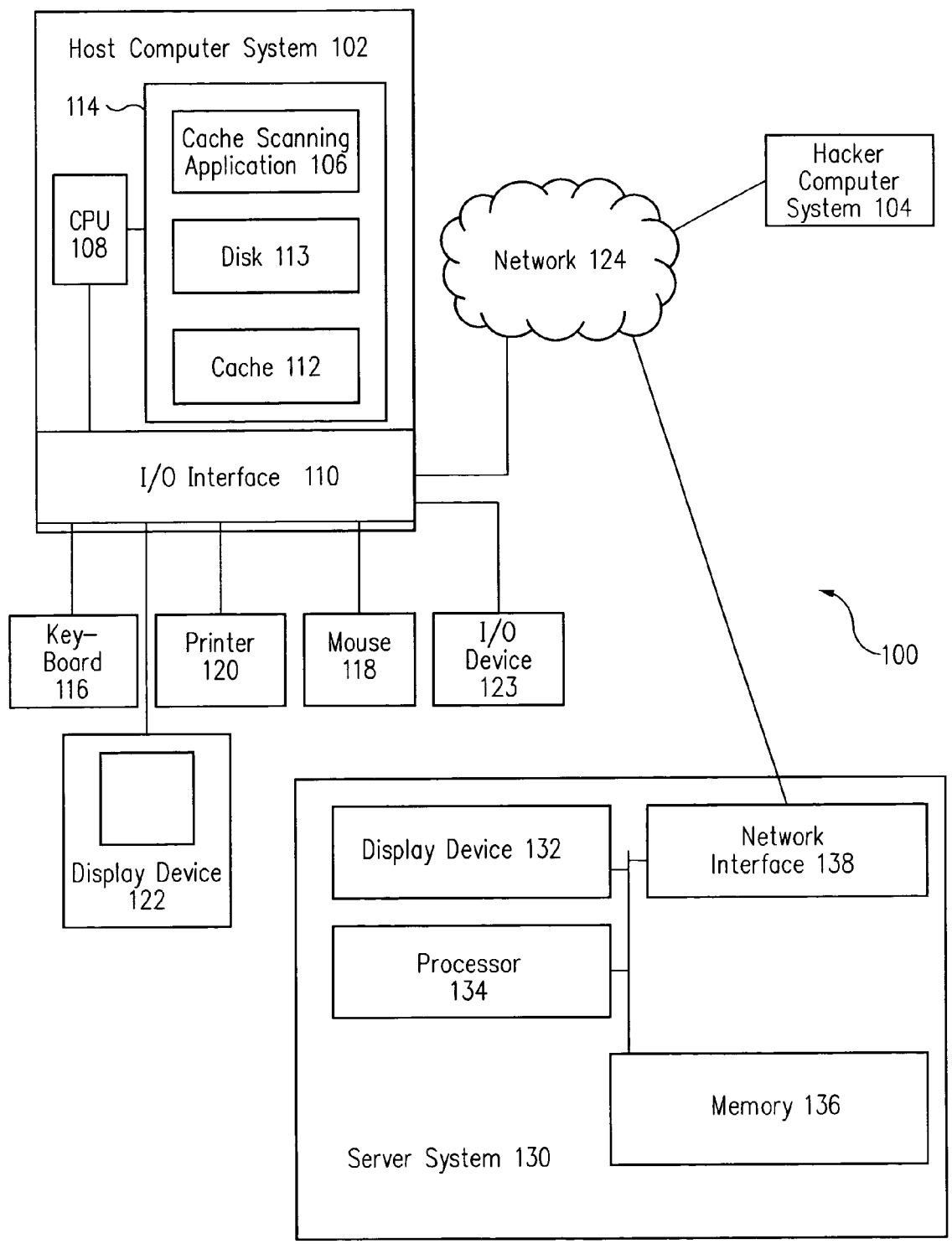
FIG. 1 is a diagram of a client-server system that includes a cache scanning application executing on a host computer system in accordance with one embodiment of the present invention.

More particularly, FIG. 1 is a diagram of a client-server system 100 that includes a cache scanning application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, host computer system 102 includes a Windows® operating system.

Memory 114 includes a cache 112, e.g., for temporary storage of files and a disk 113, e.g., for permanent storage of files. Cache 112 includes system buffers and disk cache. For example, cache 112 is random access memory (RAM), sometimes called volatile memory, temporary storage memory, temporary storage media, or non-permanent storage memory.

Generally, files stored in temporary storage memory, e.g., cache 112, are lost upon powering down (turning off) of host computer system 102. Stated another way, voltage must be supplied to the temporary storage memory for the temporary storage memory to store files. Upon loss of voltage to the temporary storage memory, the files are lost.

In one embodiment, the purpose of cache 112 is to speed disk operations. By reading/writing to cache 112, the disk operation performance is improved.

Typically, direct read and write to disk 113, sometimes called non-volatile memory, non-temporary storage memory, non-temporary storage media, or permanent storage memory, is slow. For example, disk 113 is a hard drive, e.g., a magnetic hard drive, a floppy disk, a CD-ROM, and/or a DVD.

Generally, files stored in permanent storage memory, e.g., a magnetic hard disk, a floppy disk, a CD-ROM, a DVD, are unaffected and maintained, i.e., are not lost, upon powering down (turning off) of host computer system 102. Stated another way, the permanent storage memory stores files absent voltage to the permanent storage memory.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, cache scanning application 106 is loaded into host computer system 102 via I/O device 123, such as from a CD, DVD or floppy disk containing cache scanning application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principles of the invention. Illustratively, malicious code is propagated from hacker computer system 104 to host computer system 102.

Network 124 can be any network or network system that is of interest to a user. In various embodiments, network interface 138 and I/O interface 110 include analog modems, digital modems, or a network interface card.

Cache scanning application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of cache scanning application 106 by processor 108 results in the operations of host computer process 200 as described below in one embodiment.

From an ENTER OPERATION 202, flow moves to a HOOK CACHE FLUSH INSTRUCTION(S) OPERATION 204. In HOOK CACHE FLUSH INSTRUCTION(S) OPERATION 204, cache flush instruction(s), i.e., at least one cache flush instruction, are hooked. In one embodiment, a cache flush instruction is an instruction, e.g., from a cache manager of the cache, to flush the cache, sometimes called copy or write the content of the cache to disk.

As is well known to those of skill in the art, on a Windows® NT/2000/XP operating system, the cache manager is responsible for caching of files. The cache manager communicates to the virtual memory manager (VMM), the I/O manager, and the file system driver. The operation of the cache manager is well known to those of skill in the art, e.g., is described by Rajeev Nagar, "Windows NT File System Internals: A Developer's Guide" chapters 6, 7, and 8, pages 243-355, herein incorporated by reference in its entirety, and so is not discussed in detail to avoid detracting from the principles of the invention.

Illustratively, when a file, e.g., a portable executable file, is copied from a first location to a second location, the file is fetched, sometimes called loaded or copied, from the first location into the cache. The cache is then flushed to write the file to the second location by a cache instruction.

In one embodiment, memory 114 includes a virtual memory system that maps virtual addresses located in the virtual memory address space to code and/or data located in physical memory. For example, the virtual memory system is a page based virtual memory system that uses pages, e.g., 4096 byte memory areas. Virtual memory systems and mapping of pages from files in physical memory are well known to those of skill in the art and so are only discussed briefly to avoid detracting from the principles of the invention.

In accordance with one embodiment, a file is mapped from a first location on disk into the cache. The file is manipulated and modified in the cache. The cache is flushed to write the file back to disk by a cache flush instruction.

In one embodiment, a plug-in module, e.g., of cache scanning application 106, is plugged into the cache manager. This plug-in module includes a scanning module for scanning the content of the cache for a virus infection prior to flushing of the cache. Illustratively, cache scanning application 106 includes virus definitions of known viruses, that are used by the scanning module.

From HOOK CACHE FLUSH INSTRUCTION(S) OPERATION 204, flow moves, optionally, to a CAUSE ALL EVENTS TO BE CACHED OPERATION 205. In CAUSE ALL EVENTS TO BE CACHED OPERATION 205, all events are caused to be cached. For example, an event is an action that involves copying of a file from a first location to a second location. In certain instances, the events would occur under normal operation without caching of the file.

For example, the CreateFileA( ) function has parameters they specify that caching for a particular file will not occur. However, the I/O manager is configured to cache all events during CAUSE ALL EVENTS TO BE CACHED OPERATION 205 in one embodiment. Thus, even if the parameters of the CreateFileA( ) function specify that caching for a particular file will not occur, the I/O manager nevertheless causes the particular file to be cached, i.e., copied to the cache.

From CAUSE ALL EVENTS TO BE CACHED OPERATION 205, flow moves to a CACHE FLUSH INSTRUCTION OPERATION 206. CAUSE ALL EVENTS TO BE CACHED OPERATION 205 is optional and in one embodiment is not performed. In accordance with this embodiment, flow moves directly from HOOK CACHE FLUSH INSTRUCTION(S) OPERATION 204 to CACHE FLUSH INSTRUCTION OPERATION 206.

In CACHE FLUSH INSTRUCTION OPERATION 206, an instruction, e.g., from the cache manager, to flush the cache is generated. Illustratively, a file has been copied into the cache, and an instruction to flush the cache, e.g., to copy the file to disk, is generated.

From CACHE FLUSH INSTRUCTION OPERATION 206, flow moves to a STALL CACHE FLUSH INSTRUCTION OPERATION 208. In STALL CACHE FLUSH INSTRUCTION OPERATION 208, the cache flush instruction generated in CACHE FLUSH INSTRUCTION OPERATION 206 is stalled. In one embodiment, the cache flush instruction is intercepted by a cache hook module, e.g., of cache scanning application 106.

From STALL CACHE FLUSH INSTRUCTION OPERATION 208, flow moves to a SCAN CACHE OPERATION 210. In SCAN CACHE OPERATION 210, the cache is scanned for malicious code. In one embodiment, malicious code is defined as any computer program, module, set of modules, or code that enters a computer system without an authorized user's knowledge and/or without an authorized user's consent.

To illustrate, malicious code, e.g., the Bulgarian Darth_Vather virus, injects its code into the DOS kernel in such a way that the virus does not need to allocate extra memory for itself since the virus uses a memory cave of the DOS kernel instead. The virus then modifies the DOS kernel to get control from the operating system without ever modifying the interrupt vector table.

In this manner, the virus monitors the cache for executable content by checking whenever a new file gets fetched into the cache. The virus infects the file in the cache itself. Thus, when the cache is flushed, the virus is propagated to disk, i.e., permanent storage memory.

As another example, malicious code, e.g., the W95/Repus family of viruses, jumps to kernel mode. Once in kernel mode, the virus is able to call a VxD function to query the content of the cache. If the virus finds a portable executable (PE) file in the cache, the virus infects the file. Specifically, the virus writes its code into the header of the file in the cache, and marks the page "dirty".

Thus, the virus does not access any executable content on the disk itself for write. The virus simply waits until a file is copied to a new location and the copy of the file gets infected in the cache.

Further, in another embodiment, an infected file is fetched into the cache.

Accordingly, in SCAN CACHE OPERATION 210, the cache is scanned. More particularly, the content in the cache, e.g., a portable executable file in the cache, is scanned for malicious code, including known and/or unknown malicious code. In one embodiment, the cache is scanned in a manner similar to that used by a conventional anti-virus scanner that scans for known malicious code, and/or heuristically detects unknown malicious code, and so is not discussed in detail to avoid detracting from the principles of the invention.

Generally, a file in the cache will become infected, if at all, before the file is fetched into the cache, or between the time that the file is fetched into the cache and the time that the file is flushed from the cache. Accordingly, by scanning the cache in SCAN CACHE OPERATION 210 just as the cache is being flushed, any infection of a file in the cache will already have occurred, and the malicious code will be detected in SCAN CACHE OPERATION 210.

From SCAN CACHE OPERATION 210, flow moves to a MALICIOUS CODE DETECTED CHECK OPERATION 212. In MALICIOUS CODE DETECTED CHECK OPERATION 212, a determination is made as to whether malicious code is detected in the cache.

If a determination is made that malicious code is not detected in the cache, flow moves from MALICIOUS CODE DETECTED CHECK OPERATION 212 to a RELEASE CACHE FLUSH INSTRUCTION OPERATION 214. Conversely, if a determination is made that malicious code is detected in the cache, flow moves from MALICIOUS CODE DETECTED CHECK OPERATION 212 to a KNOWN FALSE POSITIVE CHECK OPERATION 218 (or directly to a TAKE PROTECTIVE ACTION OPERATION 220 if KNOWN FALSE POSITIVE CHECK OPERATION 218 is not performed).

Accordingly, if malicious code is not detected in the cache, i.e., the file being flushed is not infected, the cache flush instruction is released in RELEASE CACHE FLUSH INSTRUCTION OPERATION 214. Upon release of the cache flush instruction, the cache is flushed and the file, which is not malicious, in the cache is copied to disk.

From RELEASE CACHE FLUSH INSTRUCTION OPERATION 214, flow moves to and exits at an EXIT OPERATION 216 or returns to CACHE FLUSH INSTRUCTION OPERATION 206 and waits for the next instruction to flush the cache.

However, if malicious code is detected in the cache, i.e., the file being flushed is infected, flow moves, optionally, to KNOWN FALSE POSITIVE CHECK OPERATION 218. In KNOWN FALSE POSITIVE CHECK OPERATION 218, a determination is made as to whether the detection of malicious code in the cache is a known false positive. In one embodiment, a known false positive is when malicious code is detected in the cache, but the cache is, in fact, safe, i.e., does not contain malicious code. KNOWN FALSE POSITIVE CHECK OPERATION 218 is optional and in one embodiment is not performed such that flow moves from MALICIOUS CODE DETECTED CHECK OPERATION 212 directly to TAKE PROTECTIVE ACTION OPERATION 220.

If a determination is made that the detection of malicious code in the cache is a known false positive, flow moves from KNOWN FALSE POSITIVE CHECK OPERATION 220 to RELEASE CACHE FLUSH INSTRUCTION OPERATION 214, which is performed as discussed above.

Conversely, if a determination is made that the detection of malicious code in the cache is not a known false positive in KNOWN FALSE POSITIVE CHECK OPERATION 218, flow moves to TAKE PROTECTIVE ACTION OPERATION 220.

In TAKE PROTECTIVE ACTION OPERATION 220, protective action is taken to protect host computer system 102 from the malicious code. In one embodiment, flushing of the cache is prevented. For example, the instruction to flush the cache is terminated. As discussed above, the instruction to flush the cache was stalled in STALL CACHE FLUSH INSTRUCTION OPERATION 208. By terminating the cache flush instruction, flushing of the cache and copying of the infected file in the cache to disk is prevented.

By preventing copying of the infected file from the cache to disk, the malicious code is prevented from being copied to disk. Accordingly, the malicious code is detected and defeated without having the malicious code copied to disk. Thus, detection of an infected file on disk and the repair of the infected file on disk are unnecessary and obviated.

For example, a file is being copied from a first location to the cache, and from the cache to a second location during the performance of an event. The file is either infected before the file is copied into the cache, or infected in the cache. In either case, in TAKE PROTECTIVE ACTION OPERATION 220, the event is failed thus preventing the infected file from being copied to the second location.

As another example, a file is mapped to the cache. The file is either infected before the file is mapped into the cache, or infected in the cache. In either case, the infected mapped file is being flushed from the cache to disk during the performance of an event. In TAKE PROTECTIVE ACTION OPERATION 220, the event is failed thus preventing the infected mapped file from being copied to disk.

In another embodiment, the cache is flushed to a secure location, e.g., a quarantine folder, in TAKE PROTECTIVE ACTION OPERATION 220. In this manner, a sample of the malicious code in the cache is captured.

In another embodiment, the source process responsible for the malicious code in the cache is terminated. By terminating the source process, further infections of files in the cache are prevented. In one embodiment, the user of host computer system 102 authorizes the taking of protective action, e.g., through a pop-up window interface provided by cache scanning application 106.

Flow moves from TAKE PROTECTIVE ACTION OPERATION 220, optionally, to a PROVIDE NOTIFICATION OPERATION 222. In PROVIDE NOTIFICATION OPERATION 222, the user of host computer system 102 and/or the administrator are notified that protective action has been taken on host computer system 102. The user and/or administrator can be notified using any one of a number of techniques, e.g., by using a pop up window, by writing to a file and/or otherwise by logging the event.

In one embodiment, the user and/or the administrator submit a sample of the malicious code to a virus collection center for further analysis in PROVIDE NOTIFICATION OPERATION 222. For example, the malicious code is detected heuristically in MALICIOUS CODE DETECTED CHECK OPERATION 212, e.g., the malicious code is unknown malicious code. The cache is flushed to a secure location in TAKE PROTECTIVE ACTION OPERATION 220 as discussed above to capture a sample of the unknown malicious code. This sample is provided to a virus collection center in PROVIDE NOTIFICATION OPERATION 222.

From PROVIDE NOTIFICATION OPERATION 222 (or directly from TAKE PROTECTIVE ACTION OPERATION 220), flow moves to and exits at EXIT OPERATION 216 or returns to CACHE FLUSH INSTRUCTION OPERATION 206 and waits for the next instruction to flush the cache.

FIG. 3 is a block diagram 300 of a hooked cache 112 in accordance with one embodiment of the present invention.

Referring now to FIGS. 1 and 3 together, a plug-in module 302, e.g., of cache scanning application 106, is plugged into a cache manager 304.

Referring now to FIGS. 2 and 3 together, plug-in module 302 includes a cache hook module 306 and a cache scanning module 308. Cache hook module 306 hooks cache flush instructions from cache manager 304 to flush cache 112 in HOOK CACHE FLUSH INSTRUCTION(S) OPERATION 204. Further, cache scanning module 308 scans the content, e.g., a file 310, of cache 112 for malicious code, e.g., malicious code 312 in an operating system 314, prior to flushing of cache 112. In one embodiment, cache scanning module 308 is similar to a conventional anti-virus scanner that scans for known malicious code, and/or heuristically detects malicious code, and so is not discussed in detail to avoid detracting from the principles of the invention.

Illustratively, an event instructs file 310 to be copied from a first location 316, e.g., on disk 113, to a second location 318, e.g., also on disk 113. This event causes file 310 to be copied into cache 112. Once in cache 112, malicious code 312 in operating system 314 infects file 310 in cache 112. Accordingly, malicious code 312 is present in file 310 and generally in cache 112.

In CACHE FLUSH INSTRUCTION OPERATION 206, an instruction, e.g., from cache manager 304, to flush cache 112 occurs. Illustratively, the cache flush instruction is an instruction to copy file 310 from cache 112 to second location 318.

The cache flush instruction is stalled in STALL CACHE FLUSH INSTRUCTION OPERATION 208. Accordingly, copying of file 310 from cache 112 to second location 318 is stalled.

Cache scanning module 308 scans cache 112, and more generally, the content of cache 112 including file 310 for malicious code in SCAN CACHE OPERATION 210.

In MALICIOUS CODE DETECTED CHECK OPERATION 212, a determination is made that malicious code 312 is detected in cache 112. As discussed above, in accordance with this embodiment, malicious code 312 has infected file 310 and thus is present in cache 112.

Because malicious code is detected in MALICIOUS CODE DETECTED CHECK OPERATION 212, flow moves to TAKE PROTECTIVE ACTION OPERATION 220 after a negative determination in KNOWN FALSE POSITIVE CHECK OPERATION 218. In TAKE PROTECTIVE ACTION OPERATION 220, the event is failed thus preventing file 310, which has been infected and includes malicious code 312, from being copied to second location 318.

By preventing copying of infected file 310 from cache 112 to disk 113 (e.g., second location 318), malicious code 312 is prevented from being copied to disk 113. Accordingly, malicious code 312 is detected and defeated without having malicious code 312 copied to disk 113. Thus, detection of an infected file on disk 113 (in permanent storage memory) and the repair of the infected file on disk 113 is unnecessary and obviated.

Referring again to FIG. 1, cache scanning application 106 is in computer memory 114. As used herein, a computer memory refers to a volatile memory, a non-volatile memory, or a combination of the two.

Although cache scanning application 106 is referred to as an application, this is illustrative only. Cache scanning application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, cache scanning application 106 is implemented as a system level, e.g., kernel mode driver.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs (CDs), DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, cache scanning application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the cache scanning functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the cache scanning functionality in accordance with one embodiment of the present invention can be implemented in a wide variety of computer system configurations. In addition, the cache scanning functionality could be stored as different modules in memories of different devices. For example, cache scanning application 106 could initially be stored in server system 130, and then as necessary, a portion of cache scanning application 106 could be transferred to host computer system 102 and executed on host computer system 102. Consequently, part of the cache scanning functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, cache scanning application 106 is stored in memory 136 of server system 130. Cache scanning application 106 is transferred over network 124 to memory 114 in host computer system 102. In this embodiment, network interface 138 and I/O interface 110 would include analog modems, digital modems, or a network interface card. If modems are used, network 124 includes a communications network, and cache scanning application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   scanning a cache for malicious code, wherein a source process monitors said cache for a file and infects said file while said file is in said cache with said malicious code, said file being uninfected with said malicious code prior to being fetched into said cache;
   determining whether said malicious code is detected in said cache; and
   taking protective action to protect a computer system upon a determination that said malicious code is detected in said cache, said taking protective action comprising terminating said source process responsible for said malicious code.

2. The method of claim 1 wherein said cache comprises system buffers and disk cache.

3. The method of claim 1 wherein said cache comprises random access memory.

4. The method of claim 1 wherein said cache comprises temporary storage memory.

5. The method of claim 1 further comprising stalling a cache flush instruction to write said file from said cache to permanent storage memory.

6. The method of claim 5 wherein said scanning a cache for malicious code comprises scanning said file in said cache.

7. The method of claim 5 further comprising releasing said cache flush instruction upon a determination that said malicious code is not detected in said cache.

8. The method of claim 7 wherein said cache is flushed upon said releasing.

9. The method of claim 5 wherein said taking protective action further comprises terminating said cache flush instruction.

10. The method of claim 5 further comprising hooking said cache flush instruction.

11. The method of claim 1 wherein said taking protective action further comprises preventing said cache from being flushed.

12. The method of claim 1 wherein said taking protective action further comprises preventing said file from being copied to permanent storage memory.

13. The method of claim 1 wherein said taking protective action further comprises flushing said cache to a secure location.

14. The method of claim 1 wherein said taking protective action further comprises capturing a sample of said malicious code.

15. The method of claim 1 further comprising determining that said determination that said malicious code is detected in said cache is not a known false positive prior to said taking protective action.

16. The method of claim 1 further comprising providing a notification of said protective action.

17. The method of claim 1 further comprising causing all events to be cached.

18. The method of claim 1 wherein said source process is in an operating system and separate from said cache.

19. A system comprising:
   a memory;
   a processor coupled to said memory;
   a means for scanning a cache for malicious code, wherein a source process monitors said cache for a file and infects said file while said file is in said cache with said malicious code, said file being uninfected with said malicious code prior to being fetched into said cache;
   a means for determining whether said malicious code is detected in said cache; and
   a means for taking protective action to protect a computer system upon a determination that said malicious code is detected in said cache, said taking protective action comprising terminating said source process responsible for said malicious code.

20. A computer-program product comprising a tangible computer readable medium selected from the group consisting of CD-ROM discs (CDs), DVDs, ROM cards, floppy discs, magnetic tapes, computer hard drives and servers on a network containing computer program code comprising:
   a cache scanning application for scanning a cache for malicious code, wherein a source process monitors said cache for a file and infects said file while said file is in said cache with said malicious code, said file being uninfected with said malicious code prior to being fetched into said cache;
   said cache scanning application further for determining whether said malicious code is detected in said cache; and
   said cache scanning application further for taking protective action to protect a computer system upon a determination that said malicious code is detected in said cache, said taking protective action comprising terminating said source process responsible for said malicious code.

21. A computer system comprising:
   a memory having stored therein a cache scanning application; and
   a processor coupled to said memory, wherein execution of said cache scanning application generates a method comprising:
   scanning a cache for malicious code, wherein a source process monitors said cache for a file and infects said file while said file is in said cache with said malicious code, said file being uninfected with said malicious code prior to being fetched into said cache;
   determining whether said malicious code is detected in said cache; and
   taking protective action to protect a computer system upon a determination that said malicious code is detected in said cache, said taking protective action comprising terminating said source process responsible for said malicious code.

22. A method comprising:
   stalling a cache flush instruction to flush a cache, wherein a source process monitors said cache for a file and infects said file while said file is in said cache with said malicious code, said file being uninfected with said malicious code prior to being fetched into said cache;
   determining that said cache comprises said malicious code; and
   terminating said cache flush instruction to prevent said cache from being flushed.

23. A method comprising:
   causing an event to be a cached event, said event comprising an action to copy a file from a first location on a disk directly to a second location on said disk, said cached event comprising an action to copy said file from said first location on said disk to a cache and from said cache to said second location on said disk;

copying said file from said first location on said disk to said cache;

intercepting and stalling a cache flush instruction to copy said file from said cache to said second location on said disk;

scanning said cache for malicious code, wherein a source process monitors said cache for said file and infects said file while said file is in said cache with said malicious code, said file being uninfected with said malicious code prior to said copying said file from said first location on said disk to said cache;

determining that said malicious code is detected in said cache; and taking protective action comprising preventing said file from being copied from said cache to said second location on said disk comprising terminating said cache flush instruction.

* * * * *